United States Patent [19]

Yamazaki et al.

[11] Patent Number: 5,011,270
[45] Date of Patent: Apr. 30, 1991

[54] LIQUID CRYSTAL ELECTRO-OPTICAL DEVICE AND MANUFACTURING METHOD THEREFOR

[75] Inventors: Shunpei Yamazaki, Tokyo; Masahiko Sato, Atsugi, both of Japan

[73] Assignee: Semiconductor Energy Laboratory Co., Ltd., Atsugi, Japan

[21] Appl. No.: 489,348

[22] Filed: Mar. 6, 1990

Related U.S. Application Data

[60] Division of Ser. No. 470,725, Jan. 26, 1990, which is a continuation of Ser. No. 250,411, Sep. 28, 1989, Pat. No. 4,906,074.

[30] Foreign Application Priority Data

Sep. 29, 1987 [JP] Japan .............................. 62-244808
Oct. 7, 1987 [JP] Japan .............................. 62-253178
Oct. 7, 1987 [JP] Japan .............................. 62-253179
Oct. 7, 1987 [JP] Japan .............................. 62-253180

[51] Int. Cl.$^5$ .............................................. G02F 1/13
[52] U.S. Cl. ................................ 350/350 S; 350/340; 350/341

[58] Field of Search ..................... 350/350 S, 340, 341

[56] References Cited

U.S. PATENT DOCUMENTS 4,744,639 5/1988 Tsuboyama ...................... 350/350 S
4,783,148 11/1988 Tsuboyama et al. ............... 350/341
4,836,653 6/1989 Yoshino et al. ...................... 350/341
4,906,074 3/1990 Yamazaki et al. ............... 350/350 S Primary Examiner—Stanley D. Miller
Assistant Examiner—Huy K. Mai
Attorney, Agent, or Firm—Sixbey, Friedman, Leedom & Ferguson

[57] ABSTRACT

A liquid crystal display comprises a pair of substrates provided with an electrode arrangement in matrix form. A chiral smectic C phase liquid crystal material is interposed between the substrates. In the liquid crystal layer, each pixel consists of a number of micro-domains which can be compared to polycrystal line structures. Interaction between adjacent pixels through well ordered liquid crystal structure is suppressed by virtue of the micro-domains.

5 Claims, 5 Drawing Sheets

LIQUID CRYSTAL ELECTRO-OPTICAL DEVICE AND MANUFACTURING METHOD THEREFOR

This is a Divisional application of Ser. No. 07/470,725, filed Jan. 26, 1990, which is a continuation of Application Ser. No. 07/250,411, filed Sept. 28, 1988, now U.S. Pat. No. 4,906,074.

BACKGROUND OF THE INVENTION

The present invention relates to a liquid crystal device, more particularly relates to ferroelectric liquid crystal device and manufacturing method therefor.

Heretofore, it is known to utilize twisted nematic liquid crystals for devising electro-optical displays. The liquid crstal materials are employed in layer form which is finely divided into a number of pixels by virtue of a matrix electrode arrangement contiguous to the liquid crystal layer. However, due to occurence crosstalk between adjacent pixels during operation in a time multiplexing mode, the number or densities of pixels is substantially limited.

Switching is performed by means of thin film transistors provided for every pixels, the driving fashion being called active matrix system. However, because of complexities of manufacture process, it is very difficult to produce a display having a large area when reduction of cost is interested.

In attempt to solve the above shortcomings of prior art devices, Clerk et al. proposed a ferroelectric liquid crystal device in their U.S. Pat. No. 4,367,924. FIG. 1 is an explanatory schematic diagram showing the action of liquid crystal molecules in the prior art devices. A ferroelectric liquid crystal is interposed between a pair of glass substrates 11 and 11' which is provided with an electrode arrangement made of $In_2O_3$, $SnO_2$ or ITO (Indium Tin Oxide) on the inside thereof. The liquid crystal is arranged between the substrates so that each molecular layer 12 is formed normal to the substrates as illustrated in the figure. The phase of the liquid crystal is chiral smectic C at which the device is driven, desirably at room temperature. The liquid crystal molecule takes two stable positions I and II which make angles $\theta$ and $-\theta$ with the layer normal as shown in FIG. 2.

The position of molecules switchs between the two stable positions in the light of an externally applied electric field normal to the substrates, whereupon visual images can be constructed based on differential birefringence among pixels. One feature of this type of display devices is bistablity by virtue of which the position of each liquid crystal molecule is maintained same as previous state even after the applied signal is removed until another signal is applied anew in the opposite sense. Namely, they can fuction as memory elements.

To such a ferroelectric liquid crystal device, it has been required to obtain a uniform state of liquid crystal without imperfections throughout the liquid crystal layer between a pair of substrates for uniform drive capability throughout the entire display area. The liquid crystal layer of this condition is referred to as "mono-domain" hereinafter.

Imperfections and defects are caused because of small flaws of orientation control films, unevenness of an electrode arrangement formed on the substrates, spacers and other causes. In order to avoid occurrence of such imperfections and defects, mono-domain has been developed by temperature gradient method in which crystalline structure of liquid crystal is one-dimensionally developed inwardly from one end of the display area.

However, epitaxial growth of the smectic phase from a spacer edge under appropriate temperature gradient application of the gradient temperature method is effective only when the display area of devices exceeds several squared centimeters. Furthermore, even if a large area mono-domain is consturcted, the crystalline direction is not exactly aligned parallel to the substrates, making a pre-tilted angle with the substrate plane. For this reason, liquid crystal molecular layers tend to bend causing zig-zag structures. The switching due to external electric fields may take place in reverse senses at the both sides of a folding plane in the zig-zag structure. It has been often observed that uniform display and driving performance are hindered by the zig-zag structure.

The inventors have repeated experiments using liquid crystal displays comprising a chiral smectic C liquid crystal (ferroelectric liquid crystal). However, they have failed to satisfactorily drive the displays and to obtain clear images. This fail is supposed because of interaction between pixels. The main cause of interaction might be quasi-monocrystalline (homogeneously ordered without discontinuity) regions bridging adjacent pixels. In other words, the switching of one pixel might influence an adjacent pixel through the monocrystalline region bridging therebetween.

SUMMARY OF THE INVENTION

It is an object of the present invention to provide a liquid crystal device which can be driven with pixels distinctly.

In order to accomplish the above and other objects, micro-domains are formed in each pixel consisting of a chiral smectic liquid crystal layer. The micro-domains are regions of several microns width and several hundreds microns length in which molecules are oriented in mono-crystalline form, but interfaces among the micro-domains constitute discontinuity which hinders influence of orderliness of one micro-domain upon others. Each pixel comprises a number of micro-domains. Position of liquid crystal molecules can switch individually in each mirco-domain by virtue of an electric field exercised thereupon. The interaction between the micro-domains subjected to an applied electric field and a neighbouring micro-domains free of the field are suppressed in the light of the interfaces therebetween.

The improved structure is produced by interposing a composite liquid crystal material between a pair of substrates provided with an orientation control surface in the inside, at a relatively high temperature at which the liquid crystal material is in an isotropic phase, and gradually cooling the liquid crystal material so that ordered arrangement is developed with micro-domains.

Unlike conventional structures in which liquid crystal molecules are aligned in a particular direction, liquid crystal molecules in accordance with the present invention are aligned in deverse directions whereby a number of micro-domains are formed. Preferably, the average dimension of said micro-domains with reference to the row direction is one or much order of magnitude smaller than that of said pxiel.

DETAILED DESCRIPTION OF THE PREFERRED EMBODIMENTS

Figure 1:
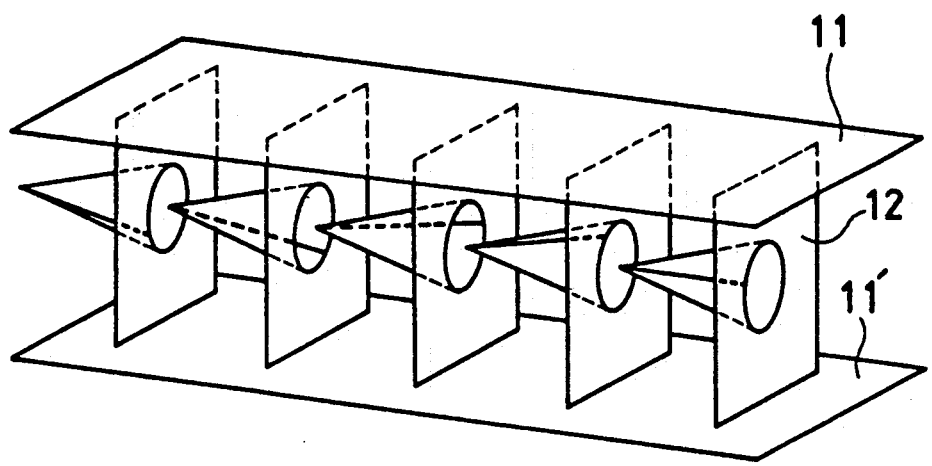
FIG. 1 is an explanatory view showing the condition of liquid crystal molecules interposed between substrates.
Figure 2:
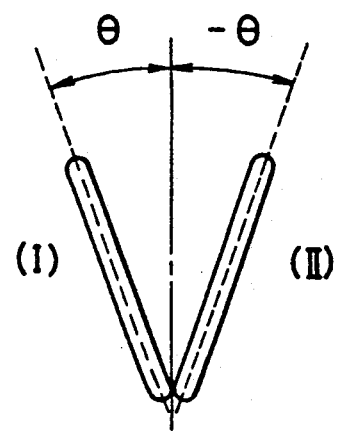
FIG. 2 is a schematic diagram showing two stable positions of a liquid crytal molecule.
Figure 3:
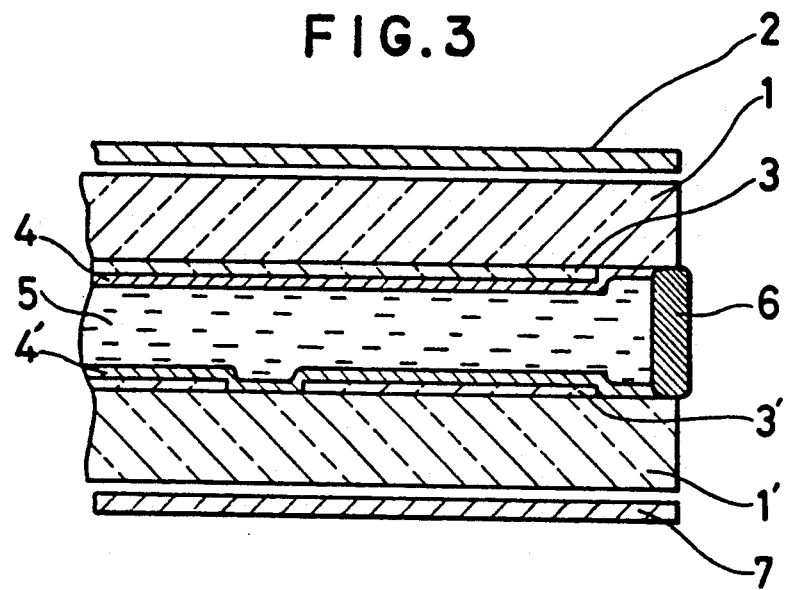
FIG. 3 is a cross sectional view of a liquid crystal device comprising a chiral smectic liquid crystal material.

Referring now to FIG. 3, a liquid crystal display device in accordance with the present invention is illustrated in a cross sectional view. The device comprises a pair of glass substrates 2 and 2', a first parallel electrode strips formed on the substrate 2 and extending in the lateral direction, a second parallel electrode strips formed on the substrate 2' and extending in the normal direction to the plane of the drawing sheet, a first orientation control film 4 made of a polyimide resin, a second orientation control film 4' made of $SiO_2$, and an ester ferroelectric liquid crystal layer 5. The ferroelectric liquid crystal material is a composite chiral smectic C phase liquid crystal. The combination of the first and second electrode strips 3 and 3' constitutes an electrode arrangement in a matrix form comprising a number of pixels. By appropriately selection of a suitable resin to form the orientation control films, it is made possible to relatively rise the threshold level of the switching signals applied to the liquid crystal layer. The first and second orientation control films 4 and 4' are given rubbing treatment. Assuming the scanning of the pixels is to be carried out in the direction parallel to the first electrode strips 3, the rubbing have to be performed in the direction normal to the plane of the drawing sheet. In other words, rubbing is performed along the columns in case of designs adapted for scanning along the rows. The periphery of the substrates is provided with a sealing member 6 for avoiding a loss of liquid crystal. Reference numerals 1 and 7 designate polarizing plates arranged at the right directions. The dimensions of parts of the device shown in the figure are only chosen for illustration but not in accordance with a real design. Although not shown in the figure, when assembled, spacers are interposed between the substrates in order to maintain the distance constant. In reality, the distance between the substrate is 3 microns; the width of each electrode strip is 0.36 mm and separated from an adjacent strip by 0.04 mm intervals.

Particularly, in accordance with the present invention, the liquid crystal material is prepared in order to have a broad transition range within which the phase of the liquid crystal is gradually changed from its isotropic phase to its quasi-crystalline phase. In order to obtain such a transition characteristic, the liquid crystal material is prepared by blending several kinds of liquid crystals. The liquid crystal constituents are selected from those having diverse transition temperatures distributed over a wide temperature range. We have obtained a composite liquid crystal material having a wide transition temperature range by blending eight kinds of liquid crystal esters.

When follow are eight liquid crystal constituents with respective proportion in parenthesis which constitute a composite liquid crystal in accordance with the present invention.

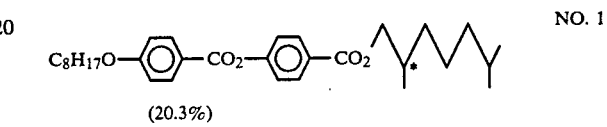

(20.3%)

$Cryst \longleftarrow (31.8° C.) \longrightarrow Sm_C^* \longleftarrow (32.6° C.) \longrightarrow$ $Sm_A \longleftarrow (53.0° C.) \longrightarrow Iso$

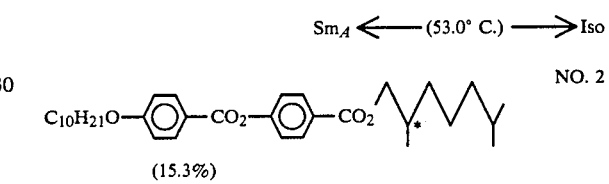

(15.3%)

$Cryst \longleftarrow (42.6° C.) \longrightarrow Sm_C^* \longleftarrow (43.8° C.) \longrightarrow$ $Sm_A \longleftarrow (54.2° C.) \longrightarrow Iso$

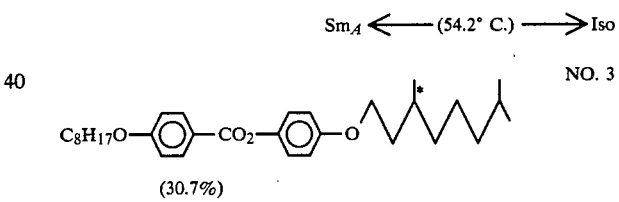

(30.7%)

$Cryst \longleftarrow (47.3° C.) \longrightarrow Sm_C^* \longleftarrow (47.8° C.) \longrightarrow$ $Sm_A \longleftarrow (58.7° C.) \longrightarrow Iso$

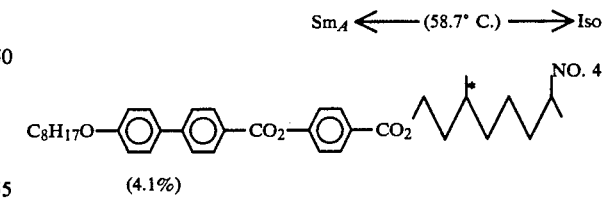

(4.1%)

$Cryst \longleftarrow (75.9° C.) \longrightarrow Sm_C^* \longleftarrow (136.3° C.) \longrightarrow$ $Sm_A \longleftarrow (162.2° C.) \longrightarrow Iso$

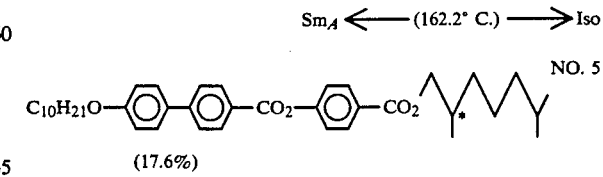

(17.6%)

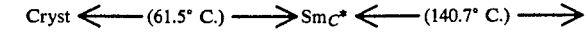

$Cryst \longleftarrow (61.5° C.) \longrightarrow Sm_C^* \longleftarrow (140.7° C.) \longrightarrow$

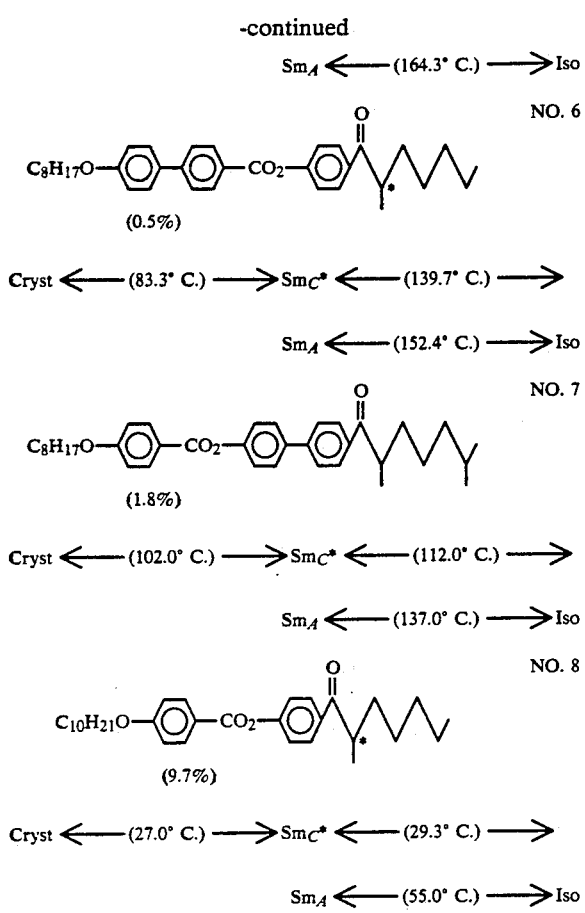

By blending the above constituents, a liquid crystal material was obtained with its transition characteristics such that Crystal<—(4.7° C.-3.5° C.)—>S$_C^*$<—(62.5° C.-51.9° C.)—>Sm$_A$<—(89.7° C.-75.4° C.)—>Iso It will be not difficult for those skilled in the art to prepare liquid crystal materials which have transition characteristics suitable to the applications. In accordance with experimental, we prepared another liquid crystal material whose phase transition was such that isotropic liquid <—(130° C. -98° C.)—> smetic A <—(73° C.-60° C.)—> smectic *C <—(10° C.-0° C.) —> smectic *I<—(−10° C.)—> crystal.

Figure 4:
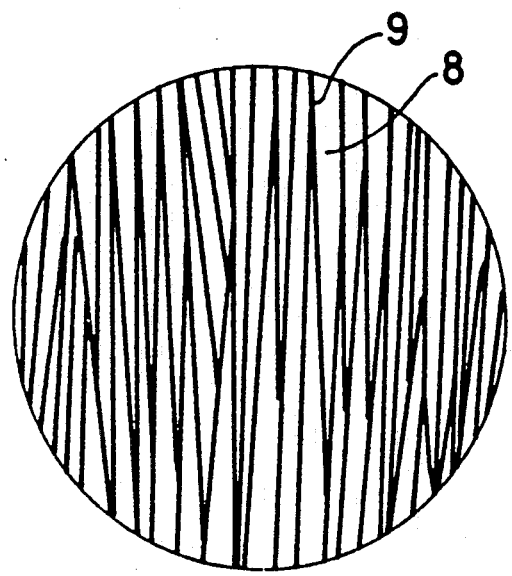
FIG. 4 is a schematic view showing a micro-domain texture in a liquid crystal layer.

After interposing such a composite liquid crystal material between the orientation control films provided on the substrates 2 and 2' at a temperature at which the liquid crystal material is in its isotropic phase, the structure is gradually cooled to a temperature at which the entirety of the composite liquid crystal material is in its smectic phase. By the way, liquid crystal molecules form micro-domains which grow as the temperature rises. Each micro-domain can be regarded to have a quasi-monocrystalline structure. The proportion of each constituent being 5-20%. It will be desired in general to limit the maximum proportion of the constituents up to 20% and to use many kinds of liquid crystals at nearly equal proportions respectively. The formation of micro-domains in the liquid crystal layer starts along the oriented surface given rubbing treatment so that the quasi-polycrystalline area consisting of micro-domains gradually grows as the temperature rises. FIG. 4 shows a sketch topologically drafted in accordance with a microscopic photograph of the micro-domains. The width and the length of each micro-domain 8 are about several microns and several hundreds microns respectively. The significant feature of the structure comprising the micro-domains is the absence of zig-zag defects. While the interfaces 9 between the micro-domains 8 are defects, the entirety of the liquid crystal can be regarded approximately as a uniform quasi-crystalline structure except for the interfaces between the domains which are small defects.

When a sawtooth pulse having a maximum voltage of ±10V is applied between the electrode strips 3 and 3', the molecular state of the pixel just sandwiched by the activated two electrodes is changed. The state change takes place uniformly in every micro-domain 8 within the pixel so that the entirety of the pixel is changed at once. In accordance with experimental, there was observed no difference in the changing process between a central position and a prepheral position of the pixel.

Figure 5A:
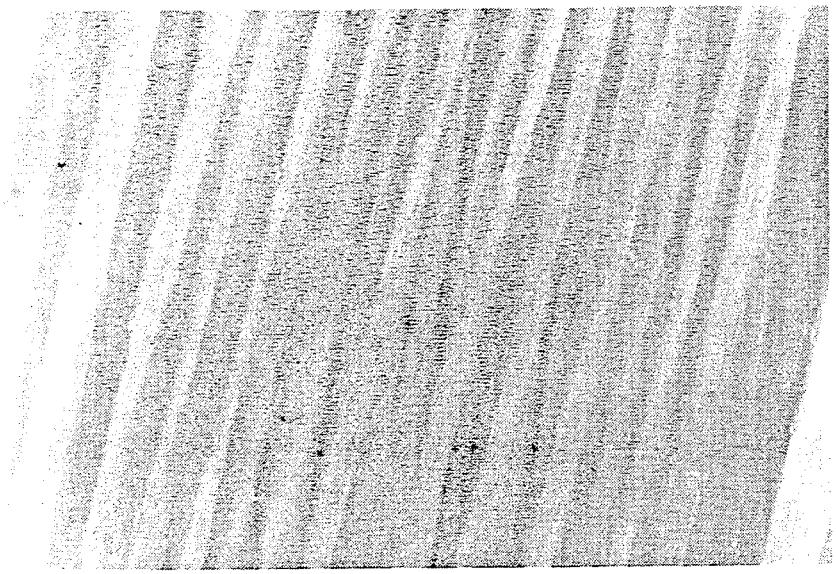
FIGS. 5(A) and 5(B) are microscopic photographs of micro-domains taken at two sites in a liquid crystal structure of 20 microns thickness in smectic A phase in accordance with the present invention with magnification of 200 by use of polarizing plates which are arranged normal to each other and sandwich the liquid crystal structure.
Figure 5B:
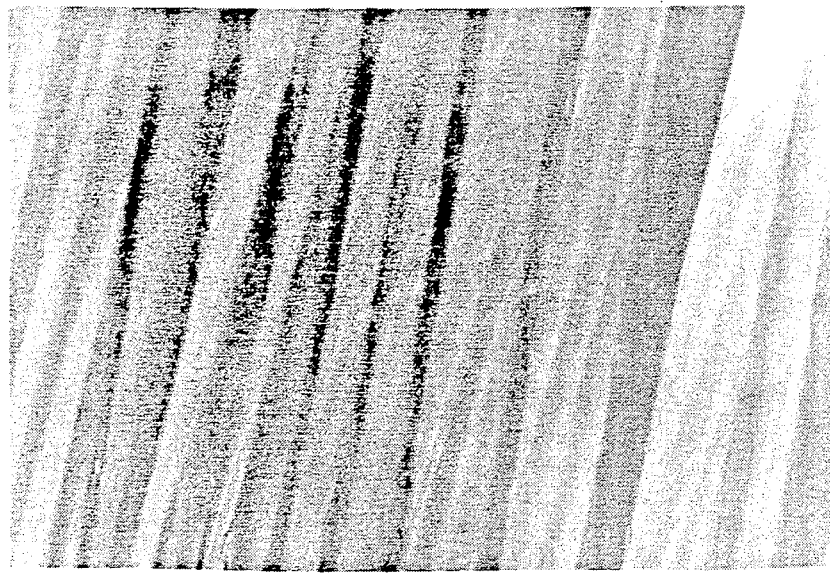

FIGS. 5(A) and 5(B) are microscopic photographs showing micro-domains taken at two sites of a liquid crystal layer in smectic A in accordance with the present invention with magnification of 200 by use of polarizing plates which are arranged normal to each other and supporting the liquid crystal therebetween. The distance between a pair of substrates was selected to be 20 microns rather than 3 microns for taking photographs in which micro-domain textures appear clearly. As shown in the photographs, the liquid crystal is devided into a number of micro-domains. This means that liquid crystal molecules have been oriented uniformly in each micro-domain but adjacent micro-domains have been oriented in different orientation directions. The micro-domains have several microns in width and several hundreds microns in length. The micro-domains are formed approximately parallel to the rubbing direction given to the orientation control films.

Figure 6A:
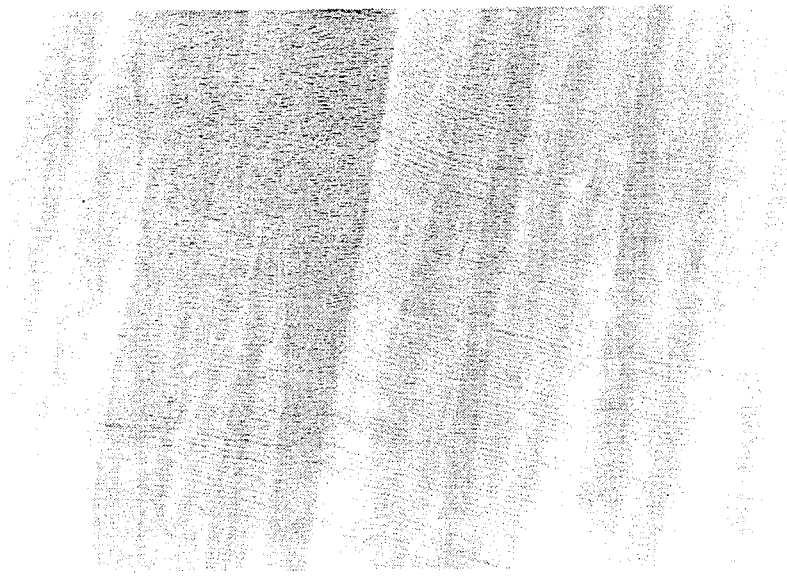
FIGS. 6(A) and 6(B) are microscopic photographs of micro-domains taken at two sites in a liquid crystal structure of 20 microns thickness in smectic C phase in accordance with the present invention with magnification of 200 by use of polarizing plates which are arranged normal to each other and sandwich the liquid crystal structure.
Figure 6B:
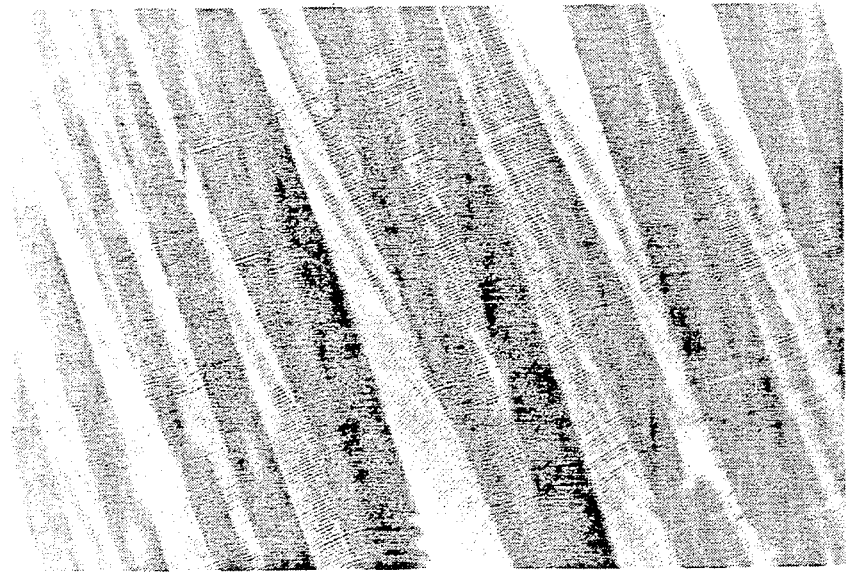
Figure 7A:
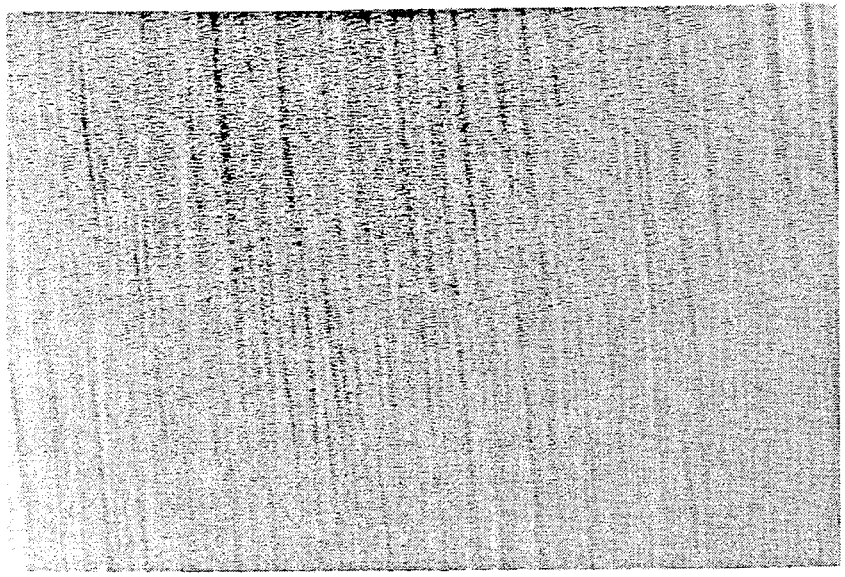
FIGS. 7(A) and 7(B) are microscopic photographs of micro-domains taken in the same condition as FIGS. 6(A) and 6(B) except that the distance between a pair of substrates sandwiching a liquid crystal layer is 3 microns.
Figure 7B:
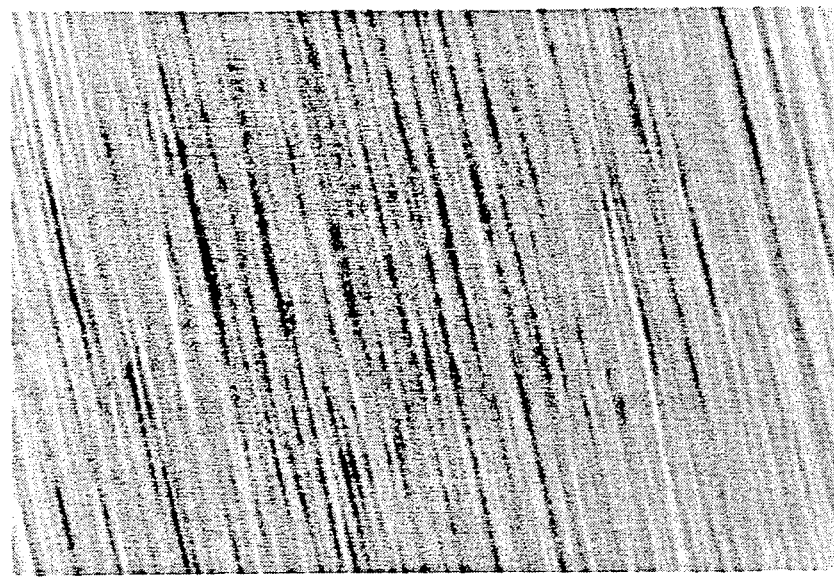

As the phase of liquid crystal is transformed to smectic C at a descended temperature. stripes appear in each micro-domain as seen from FIGS. 6(A) and 6(B) taken in the same condition as FIGS. 5(A) and 5(B) except for the temperature. The width of each stripe corresponds to one turn of the helix of the chiral smectic C liquid crystal and is about 3 microns. As shown in the photographs, stripes of neighbouring micro-domains are aligned at the interfaces. FIGS. 7(A) and 7(B) are photographs in the case that the distance between the substrates is about 3 microns, other conditions being same as FIGS. 5(A) and 5(B). The length of each micro-domains become short as compared with FIGS. 6(A) and 6(B). Such a narrow distance between the substrates allows the liquid crystal helices unwinded, and therefore the response speed becomes as fast as 10 microseconds when measured in the same condition as the case of 20 microns.

The size of the micro-domains can be changed by adjusting the preparation condition. For instance, the dimensions of micro-domains were measured in case where rubbing treatment was performed on the orientation control film with a rolling device in the following conditions.

|  | Case 1 | Case 2 | Case 3 |
| --- | --- | --- | --- |
| Number of rotation | 1.5 | 1.5 | 1.0 |
| Weight applied to the roll | 1.5 | 1.0 | 1.0 |

The figures are relative values calculated with reference to those of Case 3 being 1.0. The dimensions of micro-domains are 25 microns ×450 microns in Case 1; microns ×200 microns; and 8 microns ×200 microns. The micro-domains were observed uniformly throughout the liquid crystal layer.

Instead of the use of a composite liquid crystal having a wide transition temperature range, particular liquid crystal materials have been found to expedite the formation of micro-domains. The liquid crystals are expressed in the general formula,

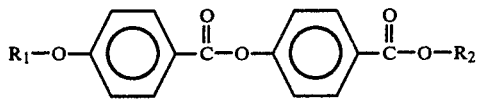

where $R_1$ is a hydrocarbon, and $R_2$ is a hydrocarbon comprising at least two asymmetric carbon atoms. By use of a liquid crystal of this type or by use of a blended liquid crystal including this type liquid crystal, micro-domains are fabricated. For instance, $R_1$ is —$C_8H_{18}$ and $R_2$ is a hydrocarbon comprising

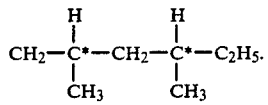

While several embodiments have been specifically described, it is to be appreciated that the present invention is not limited to the particular examples described and that modifications and variations can be made without departure from the scope of the invention as defined by the append claims.

We claim:

1. A liquid crystal device comprising:
   a pair of substrates;
   a chiral smectic liquid crystal interposed between said substrates;
   an electrode arrangement provided for defining a plurality of cell regions in said liquid crystal layer in array form and for applying an electric field to each region;
   an orientation control surface formed at least one inside surface of said substrates;
   wherein said each region consists of a plurality of micro-domains each of which forms a lozenge having two diagonals, the length of one of said diagonals is not more than 450 microns and not less than 200 microns, and the length of another diagonal is not more than 25 microns and not less than 8 microns.

2. The device of claim 1 wherein said liquid crystal layer contains a material conforming to the formula,

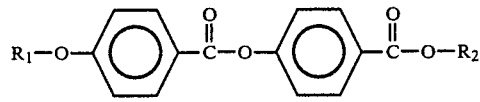

where R1 is a hydrocarbon, and R2 is a hydrocarbon comprising at least two asymmetric carbon atoms.

3. The device of claim 1 wherein the opposed inner surfaces of said substrates contiguous to said liquid crystal layer are formed of different material.

4. The device of claim 1 wherein the opposed inner surfaces of said substrates are rubbed in different directions.

5. The device of claim 1 wherein one of said surfaces of said substrates are rubbed.

* * * * *

UNITED STATES PATENT AND TRADEMARK OFFICE
Certificate

Patent No. 5,011,270

Patented: Apr. 30, 1991

On petition requesting issuance of a certificate for correction of inventorship pursuant to 35 U.S.C. 256, it has been found that the above-identified patent, through error and without any deceptive intent, improperly sets forth the inventorship. Accordingly, it is hereby certified that the correct inventorship of this patent is:

Shunpei Yamazaki, Masahiko Sato and Toshiji Hamatani.

Signed and Sealed this Twenty-ninth Day of October, 1991.

STANLEY D. MILLER

*Supervisory Patent Examiner*
*Group Art Unit 254*